United States Patent
Wu et al.

(10) Patent No.: US 7,917,648 B2
(45) Date of Patent: Mar. 29, 2011

(54) SELF-ADAPTIVE SCHEDULING METHOD AND NETWORK ELEMENT

(75) Inventors: Haitao Wu, Beijing (CN); Keping Long, Beijing (CN); Shiduan Cheng, Beijing (CN); Jian Ma, Beijing (CN)

(73) Assignee: Nokia Corporation, Espoo (FI)

( * ) Notice: Subject to any disclaimer, the term of this patent is extended or adjusted under 35 U.S.C. 154(b) by 1223 days.

(21) Appl. No.: 10/480,215

(22) PCT Filed: Jun. 27, 2002

(86) PCT No.: PCT/IB02/02458
§ 371 (c)(1),
(2), (4) Date: Dec. 10, 2003

(87) PCT Pub. No.: WO2004/004275
PCT Pub. Date: Jan. 8, 2004

(65) Prior Publication Data
US 2004/0177087 A1      Sep. 9, 2004

(51) Int. Cl.
G06F 15/173    (2006.01)
H04L 12/28     (2006.01)
H04L 12/66     (2006.01)
H04L 12/16     (2006.01)

(52) U.S. Cl. ......... 709/238; 370/402; 370/235; 370/352
(58) Field of Classification Search .................. 709/238, 709/230–237, 239–240, 217–228; 370/412, 370/352, 400, 235
See application file for complete search history.

(56) References Cited

U.S. PATENT DOCUMENTS

| | | | |
|---|---|---|---|
| 6,748,435 B1 * | 6/2004 | Wang et al. | 709/225 |
| 6,914,883 B2 * | 7/2005 | Dharanikota | 370/230.1 |
| 6,939,321 B2 * | 9/2005 | Wang et al. | 604/103.08 |
| 6,975,638 B1 * | 12/2005 | Chen et al. | 370/412 |
| 7,082,102 B1 * | 7/2006 | Wright | 370/229 |
| 7,085,236 B2 * | 8/2006 | Oldak et al. | 370/235.1 |
| 7,139,281 B1 * | 11/2006 | Bodin | 370/412 |
| 2002/0087715 A1 * | 7/2002 | De Cnodder et al. | 709/235 |

(Continued)

FOREIGN PATENT DOCUMENTS
EP      1 187 404 A2    3/2002
(Continued)

OTHER PUBLICATIONS
RFC 2697, A Single Rate Three Color Marker, p. 1 through 9, Sep. 1999.*
(Continued)

*Primary Examiner* — Haresh N Patel
(74) *Attorney, Agent, or Firm* — Mintz, Levin, Cohn, Ferris, Glovsky and Popeo, P.C.

(57) ABSTRACT

The present invention relates to a method and network element for scheduling data transmission in a packet data network, e.g. a differentiated services network. Data traffic of a predetermined traffic class is classified based on a predetermined traffic profile, e.g. responsive or non-responsive traffic, and an in-profile rate of the data traffic is estimated. Then, a weight determining a transmit order of queued data packets of said predetermined traffic class is adjusted according to the estimated in-profile rate. Thus, the data traffic is marked into different classes based on the traffic profile and a queue scheduler improves fairness between the classified flows in the packet data network. Thereby, enhanced fairness between traffic profiles can be achieved easily and effectively.

18 Claims, 4 Drawing Sheets

U.S. PATENT DOCUMENTS

| | | | |
|---|---|---|---|
| 2002/0089985 A1* | 7/2002 | Wahl et al. | 370/395.1 |
| 2003/0086140 A1* | 5/2003 | Thomas et al. | 359/167 |
| 2003/0214954 A1* | 11/2003 | Oldak et al. | 370/400 |
| 2006/0039364 A1* | 2/2006 | Wright | 370/352 |
| 2007/0087715 A1* | 4/2007 | Mimura et al. | 455/255 |
| 2007/0109968 A1* | 5/2007 | Hussain et al. | 370/232 |
| 2007/0127382 A1* | 6/2007 | Hussain et al. | 370/235 |

FOREIGN PATENT DOCUMENTS

| | | |
|---|---|---|
| GB | 2 338 372 A | 12/1999 |
| WO | WO 01/28169 A1 | 4/2001 |
| WO | WO 01/74027 A1 | 10/2001 |

OTHER PUBLICATIONS

David D. Clark and Wenjia Fang, "Explicit Allocation of Best-Effort Packet Delivery Service," IEEE/ACM Transactions on Networking, vol. 6, No. 4, Aug. 1998, pp. 362-373, IEEE, USA.

S. Blake, et al., Network Working Group, Request for Comments: 2475, "An Architecture for Differentiated Services," Date of Memo: Dec. 1998, pp. 1-36, Retrieved from Internet: <ietf.org/rfc/rfc2475.txt> on May 13, 2009.

Sally Floyd and Kevin Fall, "Promoting the Use of End-to-End Congestion Control in the Internet," IEEE/ACM Transactions on Networking, May 3, 1999, pp. 1-16.

J. Heinanen, et al., Network Working Group, Request for Comments: 2597, "Assured Forwarding PHB Group," Date of Memo: Jun. 1999, pp. 1-11, Retrieved from Internet: <ietf.org/rfc/rfc2597.txt> on May 13, 2009.

V. Jacobson, et al., Network Working Group, Request for Comments: 2598, "An Expedited Forwarding PHB," Date of Memo: Jun. 1999, pp. 1-11, Retrieved from Internet: <ietf.org/rfc/rfc2598.txt> on May 13, 2009.

J. Heinanen, et al., Network Working Group, Request for Comments: 2698, "A Two Rate Three Color Marker," Date of Memo: Sep. 1999, pp. 1-5, Retrieved from Internet: <ietf.org/rfc/rfc2698.txt> on May 13, 2009.

Sally Floyd, et al., "Equation-Based Congestion Control for Unicast Applications," SIGCOMM 2000, May 2000, pp. 1-14.

* cited by examiner

| Time (sec) | 0~20 | 20~40 | 40~60 | 60~80 |
|---|---|---|---|---|
| TCP aggregate number | 4 | 4 | 4 | 4 |
| TCP total Target Rate (kbps) | 2000 | 2000 | 2000 | 2000 |
| UDP aggregate number | 4 | 1 | 2 | 0 |
| UDP total Target Rate (kbps) | 2000 | 500 | 1000 | 0 |
| *TCP fair share (kbps)* | *2000* | *3200* | *2667* | *4000* |
| *UDP fair share (kbps)* | *2000* | *800* | *1333* | *0* |

SELF-ADAPTIVE SCHEDULING METHOD AND NETWORK ELEMENT

CROSS REFERENCE TO RELATED APPLICATIONS

This application claims priority of PCT/1B02/02458 dated Jun. 27, 2002 under 35 U.S.C. 371.

FIELD OF THE INVENTION

The present invention relates to a method and network element for scheduling data transmission in a network element, such as an IP (Internet Protocol) router, of a packet data network having e.g. a differentiated service architecture to provide scalable means for delivering quality of service based on handling of traffic aggregates.

BACKGROUND OF THE INVENTION

Traditional IP networks can provide customers with Best-Effort (BE) services only, because all the traffic competes equally for network resources. With the development of new Internet applications, such as voice, video and web services, the desire for quality of service (QoS) becomes stronger.

Recently, the Internet Engineering Task Force (IETF) has proposed a differentiated service (DS) architecture, as described for example in the IETF specification RFC 2475, to provide scalable means to deliver IP quality of service based on handling traffic aggregates, i.e. collections of data packets with the same differentiated service (DS) code point crossing a link in a particular direction. The traffic classification state is conveyed by means of IP-layer packet marking using a DS field in the packet header. Data packets are classified and marked to receive a particular per-hop behavior (PHB) on network nodes along their path. The PHB corresponds to the externally observable forwarding behavior applied at a DS-compliant node to a DS behavior aggregate. Sophisticated classification and traffic conditioning, including marking, policing, and shaping operations, need only be implemented at network boundaries. Within the DS domain, core router forward data packets according to the differentiated services code point (DSCP) value in the packet header.

Up to now, IETF has only defined two kinds of PHBs, i.e. expedited forwarding (EF) PHB and assured forwarding (AF) PHBs. EF class traffic requires low loss, low latency, low jitter, and assured bandwidth for edge-to-edge services through the DS domain. To achieve this, strict policing and shaping is needed. In contrast thereto, no quantitative requirements are defined for AF class traffic. There are four independent AF classes each comprising three drop precedence levels.

Although four AF classes have been defined, it is still unsolved how to deal with the data packets belonging to different AF classes. However, the performance or fairness of responsive flows, such as TCP (Transmit Control Protocol) packets can be affected by non-responsive flows, such as UDP (User Datagram Protocol) packets, if they are marked to the same AF class. This may encourage customers to use non-responsive flows, which will be detrimental to TCP traffic. Therefore, fairness between responsive flows and non-responsive flows has been haunting network researchers for many years. Many papers have been published for the negative impacts of an increasing deployment of non-responsive traffic, i.e. non-congestion-controlled traffic, in the Internet. For example, Sally Floyd and Kevin Fall, "Promoting the Use of End-to-End Congestion Control in the Internet", IEEE ACM Transaction on Networks, 1999, suggest promoting the use of end-to-end congestion control in the Internet. However, the network side cannot rely on customers' corporation completely. Thus, in the architecture of a DS network, this issue still remains and becomes an obstacle for guaranteed QoS.

SUMMARY OF THE INVENTION

It is therefore an object of the present invention to provide a method and network element for scheduling data transmission in a packet data network, by means of which fairness between different AF traffic classes can be ensured.

This object is achieved by a method of scheduling data transmission in a network element of a packet data network, said method comprising the steps of:
classifying data traffic of a predetermined traffic class based on a predetermined traffic profile;
estimating an in-profile rate of said data traffic; and
adjusting a weight determining a transmit order of queued data packet of said predetermined traffic class, according to said estimated in-profile rate.

Furthermore, the above object is achieved by a network element for scheduling data transmission in a packet data network, said network element comprising:
classifying means for classifying data traffic of a predetermined traffic class based on a predetermined traffic profile;
estimating means for estimating an in-profile rate of said data traffic; and
weight adjusting means for adjusting a weight determining a transmit order of queued data packets of said predetermined traffic class, according to said estimated in-profile rate.

Accordingly, in-profile traffic can be measured in each AF class as determined by the traffic profile, and the queue weights of each class can be adjusted accordingly to provide improved fairness between the classes based on the in-profile traffic in each class, e.g. responsive traffic (e.g. TCP) and non-responsive traffic (e.g. UDP). If the responsive and non-responsive traffic is marked into different AF classes and scheduled by the above scheduling algorithm, fairness between them can be achieved easily and perfectly, which has been shown by corresponding simulations. The scheduling procedure can be used together with other marking mechanisms at the edge of a DS network for traffic conditioning. A further advantage results in that the proposed scheduling scheme is very simple and easy to implement.

Preferably, data packets of the in-profile traffic are marked at an edge network element of the packet data network, and the classification step is performed by detecting the packet marking. In particular, the marking may be performed by setting a DSCP (DS code point) value in the packet header.

The data packets of the in-profile traffic may be queued in a separate sub-queue, and the queued data packets may be scheduled based on the adjusted weight. In this case, any fair scheduling procedure arranged to allocate bandwidth to said sub-queue proportional to said adjusted weight. The fair scheduling procedure may be a weighted round robin, weighted fair queuing, virtual clock, or self-clocked fair queuing procedure.

The predetermined traffic profile may be used to separate responsive traffic from non-responsive traffic. The responsive traffic may be TCP traffic, and the non-responsive traffic may be UDP traffic. The predetermined traffic class may be an AF class.

Furthermore, the in-profile rate may be a green packet rate of TCM (Three Color Marker) marked packets.

Preferably, the estimation step may be performed by periodically calculating the in-profile rate at a predetermined interval. In particular, the calculation may be a moving average calculation or a sliding window calculation. Similarly, the weight adjustment step may be performed periodically at a predetermined or dynamic interval.

For EF class traffic, a priority scheduling may be used, while the remaining bandwidth may be shared by the proposed scheduling method.

The network element may be a core router of a DS network.

BRIEF DESCRIPTION OF THE DRAWINGS

In the following, the present invention will be described in greater detail based on a preferred embodiment with reference to the accompanying drawings, in which.

DESCRIPTION OF THE PREFERRED EMBODIMENT

Figure 1:
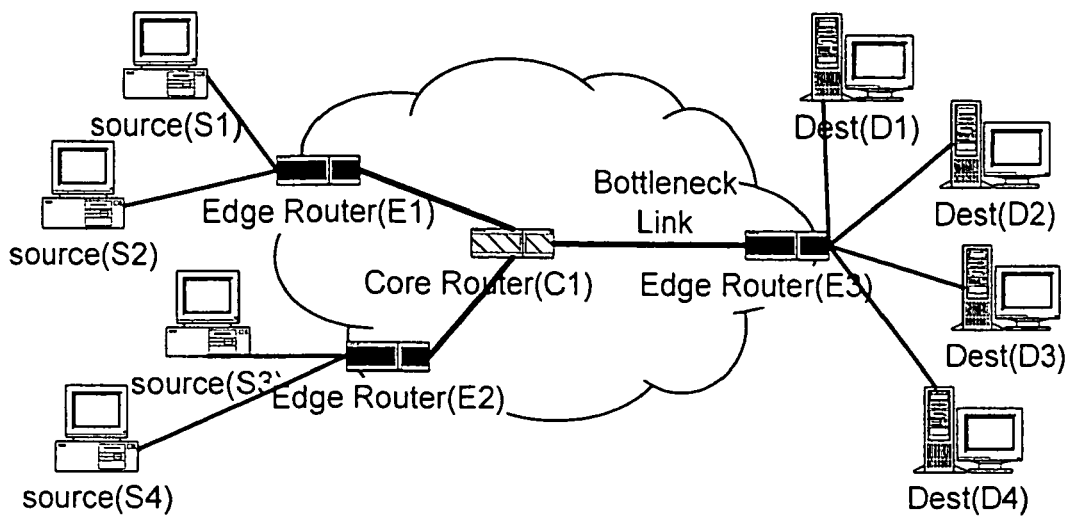
FIG. 1 shows a differentiated services network architecture.

The preferred embodiment will now be described based on a DS network architecture as shown in FIG. 1.

In the network topology according to FIG. 1, four data sources S1 to S4, four destinations D1 to D4, three edge routers E1 to E3 and one core router C1 are provided. As can be gathered from FIG. 1, the link between the core router C1 and the edge router E3 on the right side is a bottleneck link in this topology.

It is assumed that the source S1 and the source S3 generate TCP traffic, while the source S2 and the source S4 generate UDP traffic. In this case, fairness between the TCP traffic and the UDP traffic can be guaranteed if the weights of the AF class or sub-queues for the TCP traffic and the UDP traffic at the bottleneck link are set proportional to the total target rate of the TCP traffic and the UDP traffic, i.e. the sum of the traffic rates of the sources S1 and S3 for the TCP traffic and the sum of the target rates for the sources S2 and S4 for the UDP traffic. However, since an aggregate may consist of many flows or connections, those flows may have different source and destination pairs and may travel through different paths in the DS network, because their destinations may be different and IP routing protocols are dynamic. Thus, the edge routers cannot make sure how much traffic belonging to the aggregate will be at a predetermined link in the DS network. Furthermore, even if the core router C1 obtains the target rate information of the aggregate which contains the flows currently passing through the core router C1, it cannot determined how much bandwidth those flows should receive.

Therefore, according to the preferred embodiment, a self-adaptive fair scheduler (SAFS) is provided e.g. in the core router C1, which can adaptively change the weights of different sub-queues for different PHB or PHB groups of the DS network. Then, if the TCP traffic is marked to one AF PHB class and the UDP traffic is marked to another AF PHB class, the SAFS can adjust the weights for the TCP traffic and the UDP traffic dynamically according to the entire effective target rate of all flows. Moreover, there is no need to maintain any per-flow state information and add viewer overheads to the scheduler at the core router C1 of the DS network.

Figure 2:
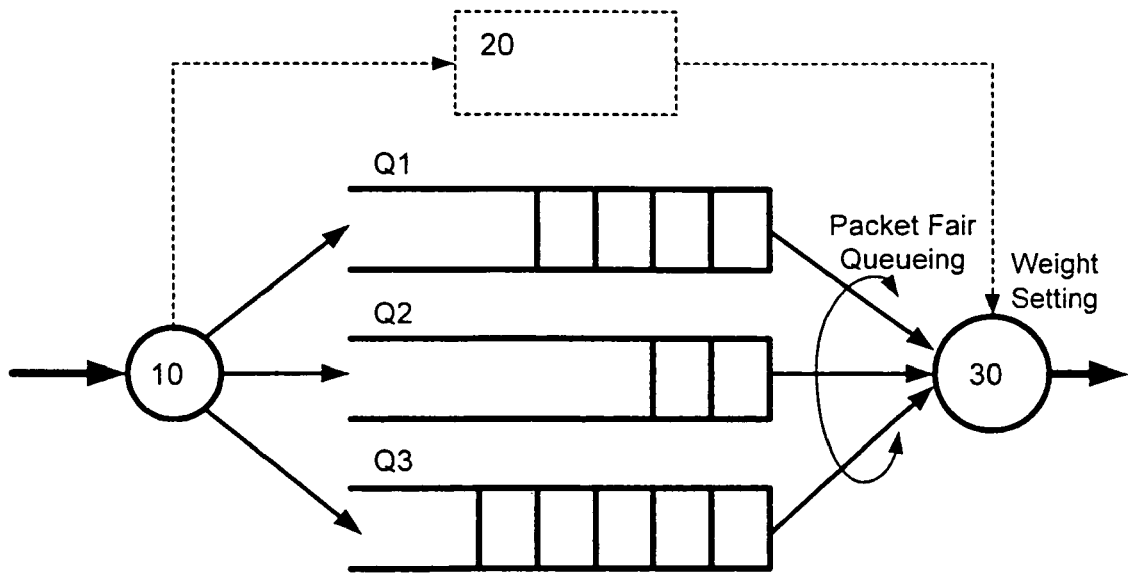
FIG. 2 shows a schematic diagram of a fair scheduling architecture according to the preferred embodiment.

FIG. 2 shows a schematic diagram indicating an architecture of the SAFS according to the preferred embodiment, which may be exploited in any kind of router. The SAFS is arranged to adjust the scheduling weights adaptively according to an estimated current in-profile rate of independent classes. The classification may be performed based on a three-drop precedence function as defined in the IETF specification RFC 2597. Assuming that green color means the lowest drop precedence, yellow color means a middle drop precedence, and red color means the highest drop precedence, the green packet rate is the in-profile rate of the AF class to thereby protect packets with lower drop precedence from being lost. Furthermore, a two-drop precedence has been proposed by Clark D. and Fang W., "Explicit Allocation of Best Effort Packet Delivery Service", ACM Transactions on Networking, August 1998, wherein two colors are used for marking in-profile packets and out-of-profile packets. In this case, the in-profile rate corresponds to the rate of packets marked as in-profile packets.

In general, the term "in-profile" is used to denote any packet or traffic, which has been marked to a predetermined priority or priority range and hence to a predetermined drop precedence or drop precedence range. In the present example, the in-profile traffic corresponds to data packets which have been marked to the highest priority, i.e. to the lowest drop precedence. Other packets are considered as out-of-profile traffic. Thus, in the two-color mode, in-profile traffic are those packets whose color is IN, and in the three-color mode, in-profile traffic are those packets whose color is Green.

According to the SAFS architecture shown in FIG. 2, a classifier 10 is provided for classifying packets belonging to different PHB groups in order to be queued in different sub-queues Q1 to Q3. The classifier 10 is arranged to classify packets based on their marking or header information, e.g. according to the differentiated services code point (DSCP) value in the packet header, which is a specific value used to select a PHB. Furthermore, the classifier 10 is arranged to supply detected in-profile packet information to an in-profile rate estimator 20 for counting. The in-profile rate estimator 20 is responsible for calculating or estimating an in-profile packet arriving rate. The estimation may be performed by any known rate estimation method, or just by periodically calculating the in-profile rate as a predetermined interval. In the latter case, an Exponential Weighted Moving Average (EWMA) as described by Sally Floyd et. al. in "Equation-Based Congestion Control for Unicast Applications", IEEE SIGCOMM'2000, a Timing Sliding Window (TSW) as described by Clark et al. in their above mentioned publication, or any other suitable estimation method may be applied. Due to the fact that the DS network needs to provide a traffic conditioning (TC) function at the edge routers E1 to E3, wherein wherein a rate estimator is required for marking purposes, the same rate estimation method can be used by the in-profile rate estimator 20.

Furthermore, a scheduler 30 is provided for setting respective weights for each of the sub-queues Q1 to Q3 based on the estimated in-profile rate determined by the in-profile rate estimator 20. In particular, the weights may be adjusted periodically for a determined or dynamic interval obtained from a timer function. The scheduling function may be a packet fair queuing (PFQ) scheduling function which allocates bandwidth to the sub-queues Q1 to Q3 according to the determined weights. In particular, the scheduling may be based on any known scheduling algorithm, such as Weighted Round Robin (WRR), Weighted Fair Queuing (WFQ), Virtual Clock (VC), Self-Clocked Fair Queuing (SCFQ), or the like.

It is noted that only in-profile packets need to be counted or processed by the in-profile rate estimator 20. Furthermore, the estimation algorithm may be extended by counting both green and yellow marked packets for TCP to thereby favor TCP traffic.

Figure 3:
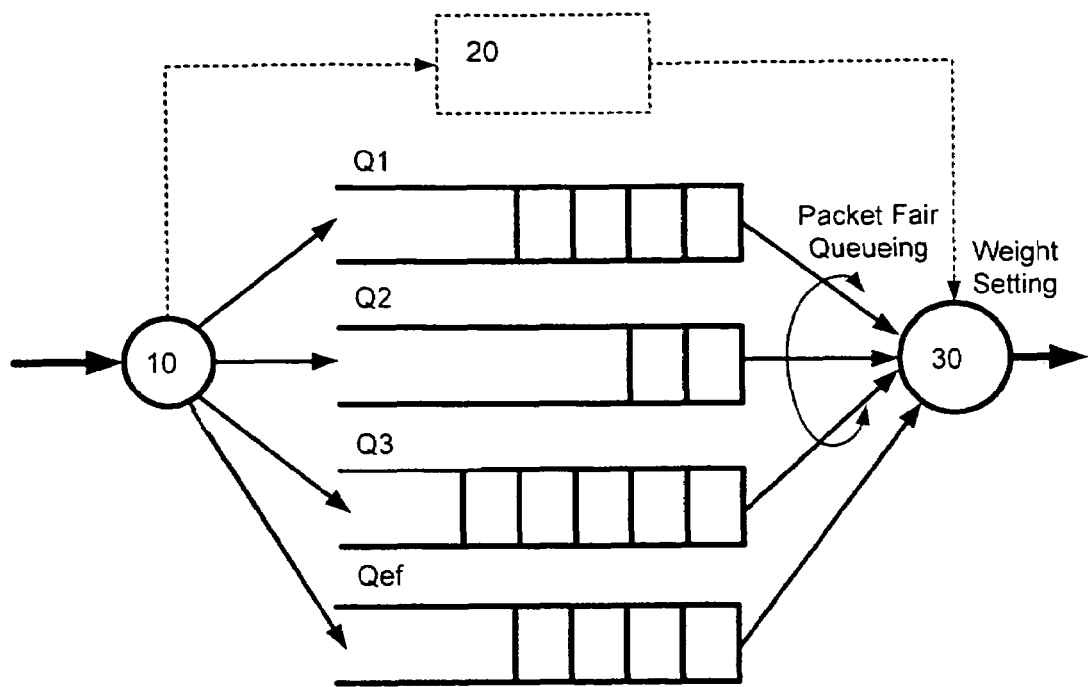
FIG. 3 shows a schematic diagram of a modification of the fair scheduling architecture according to the preferred embodiment.

FIG. 3 shows a modification of the SAFS architecture according to the preferred embodiment, which is adapted for the use of EF-PHB class to be scheduled as a class with high weight. As required in the IETF specification RFC 2598, the EF PHB should experience less delay and jitter to implement a virtual line service. This can be achieved by using WRR scheduling or priority queuing. As indicated in FIG. 3, an additional queue Qef the EF class traffic is provided for a priority queuing of EF packets. Thus, in case any EF packet is received at the classifier 10, it will be supplied to the priority queue Qef and will be scheduled with highest priority by the scheduler 30. After the EF PHB has been satisfied, AF packets can share the rest bandwidth by using the sub-queues Q1 to Q3 and the proposed SAFS procedure.

Figure 4:
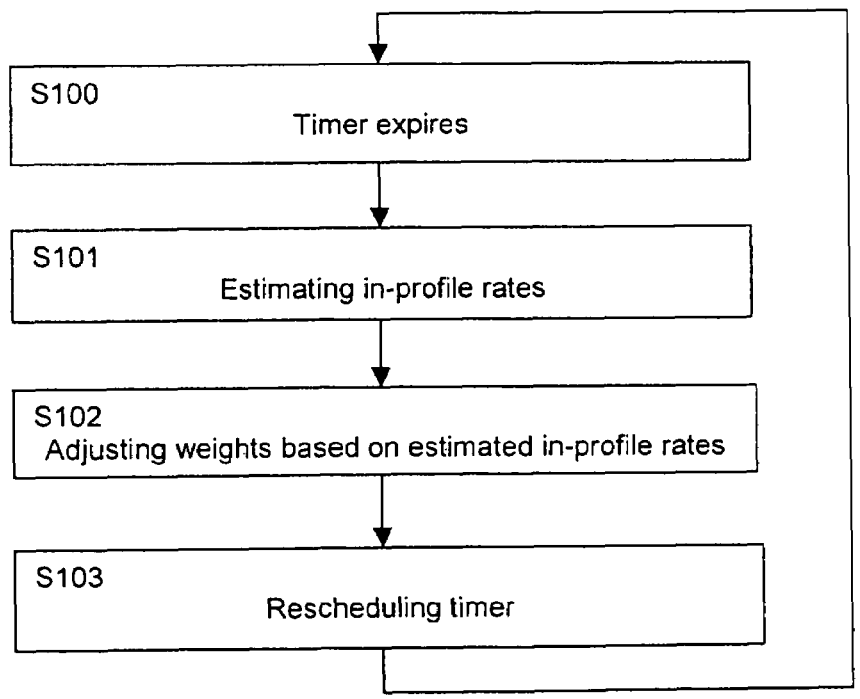
FIG. 4 shows a flow diagram of a fair scheduling method according to the preferred embodiment.

FIG. 4 shows a flow diagram indicating basic periodical steps of the fair scheduling procedure according to the preferred embodiment. As soon as a timer function provided in the classifier 10 or in-profile rate estimator 20 or any other location of the router architecture indicates the expiry of a set interval (Step S100), the in-profile rate estimator 20 starts an estimation procedure in order to estimate the in-profile rates for the selected traffic classes corresponding to the sub-queues Q1 to Q3, e.g. TCP traffic and UDP traffic. Then, in step S102, the weights for the scheduler 30 are adjusted based on the corresponding estimated in-profile rates to thereby determine the transmit order of the packets stored in the sub-queues Q1 to Q3 so as to obtain a dynamic fair queuing or scheduling. Finally, the timer is rescheduled in step S103 and the procedure jumps back to step S100 in order to start again when the timer has expired. Thus, a simple and effective scheduling procedure for obtaining fairness between AF classes, such as TCP and UDP can be achieved.

In the following, simulation results obtained on the basis of the network architecture of FIG. 1 are described. In particular, the scheduler 30 may be arranged as a WRR scheduler, wherein the weights are selected to be proportional to the number of bytes which the respective sub-queue can consume in one round. In WRR, packets are sent by a polling cycle in the round robin mode. If the number of left bytes is greater than the length of packets at the sub-queue head, then the packet and token number minus the packet length is sent. Each of the sub-queues Q1 to Q3 is checked by polling, i.e. if the last sub-queue Q3 has been reached then the procedure starts again from the first sub-queue Q1. If all sub-queues Q1 to Q3 cannot send any packet or are empty at a cycle check, then a new round begins. To provide dynamic weights, the time for weight setting in step S102 of FIG. 4 is set just before a new round begins so that the bandwidth can be divided proportional to the new weights at the new round.

As already mentioned, if a three-drop precedence is used in one class, then green packets are considered as in-profile traffic. Alternatively, if a two-drop precedence is provided, then packets marked as in-profile are considered as in-profile traffic.

Figures 5, 6:
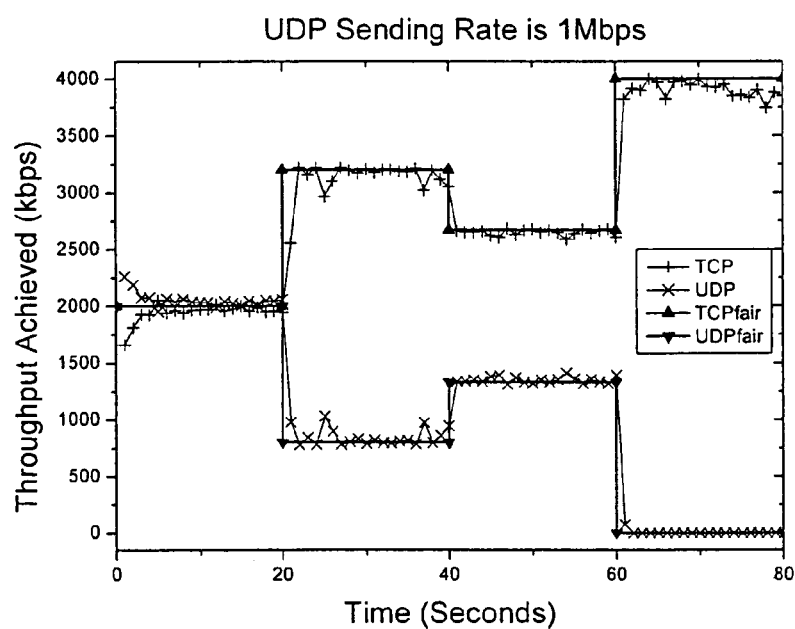
FIG. 5 shows a table indicating traffic parameters and fair share values for a dynamic change of a UDP target rate.
FIG. 6 shows a diagram indicating a time-dependent behavior of the fair scheduling scheme according to the preferred embodiment in case of the dynamic change indicated in FIG. 5.

To evaluate the dynamic behavior of the SAFS according to the preferred embodiment, a situation is created where the ratio of the total expected rates of TCP and UDP traffic changes with time as indicated in the table of FIG. 5. Particularly, the expected rate or fair share of the UDP traffic is adjusted by controlling the total target rate of UDP traffic which will pass through the bottleneck link of FIG. 1. In the table of FIG. 5, the time interval of each flow state, the aggregate numbers, i.e. number of flows with the same DSCP value, of TCP and UDP traffic, and the ideal fair share of TCP and UDP traffic are given. In particular, the UDP aggregate number is changed according to a predetermined profile. In the simulation example, the bandwidth of the bottleneck link is set to 4 Mbps. Thus, the sum of fair shares of TCP traffic and UDP traffic is equal to this bottleneck link bandwidth. Every TCP and UDP aggregate has a target rate of 500 kbps. One TCP aggregate consists of one TCP SACK (Selective Acknowledgement) connection. The marking is done based on a token bucket algorithm, and the queue management mechanism of the sub-queues Q1 to Q3 is RIO as described by Clark et al. in their above mentioned publication.

FIG. 6 shows a diagram indicating the time dependent behavior of the SAFS according to the preferred embodiment in case of the UDP traffic change indicated in FIG. 5. The bold lines indicate the respective fair shares given in the last two lines of the table shown in FIG. 5, while the simulation results for TCP traffic are indicated by "+" markings, and the simulation results of the UDP traffic are indicated by "×" markings. From FIG. 6, it can be gathered that no significant difference is obtained if the sending rate of the UDP traffic is changed, and a good fairness is provided. Moreover, the SAFS according to the preferred embodiment is able to keep the achieved throughput close to the perfect fair share even at times when the traffic changes greatly. Thus, a fair scheduling algorithm is provided which is adaptive to traffic dynamics and which provides fairness at the same time.

Figure 7:
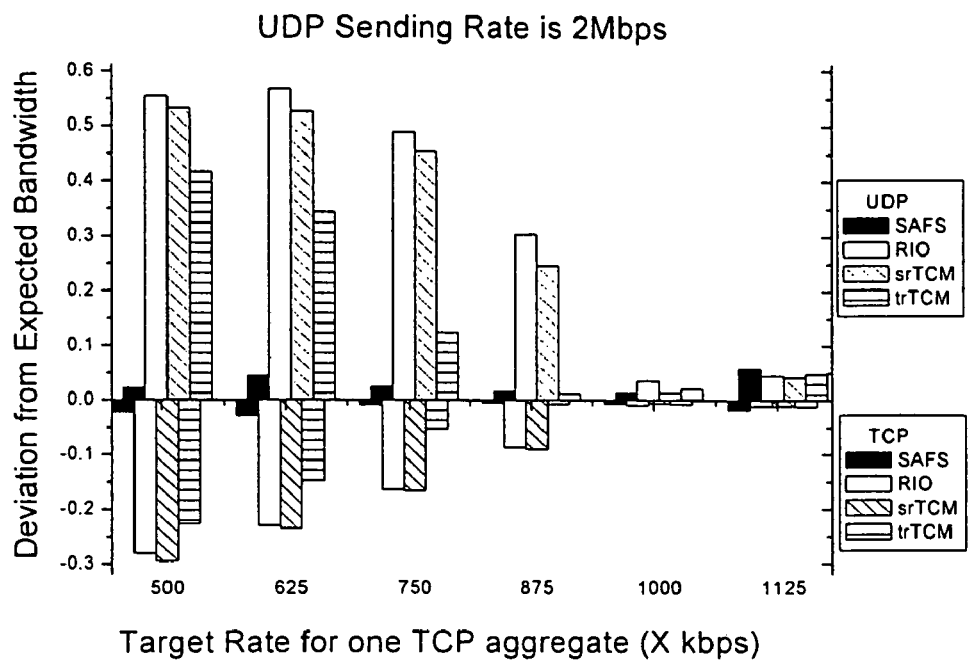
FIG. 7 shows a diagram indicating a deviation from an expected bandwidth for different target rates of a TCP aggregate at a predetermined UDP sending rate.

FIG. 7 shows a diagram indicating the deviation from the expected bandwidth at different target rates for one TCP aggregate and a predetermined UDP sending rate of 2 Mbps for the SAFS architecture according to the preferred embodiment and conventional procedures, i.e. RIO, srTCM and trTCM. The fair share of TCP traffic and UDP traffic is to distribute the bottleneck bandwidth to them proportional to their total target rate. Again, the sum of the TCP fair share and the UDP fair share equals to the bottleneck link bandwidth, e.g. 5 Mbps. In the simulation, the sending rate of the UDP traffic is set higher than its fair share, such that there is no limitation from the UDP source regarding the fair share. The deviation indicated in the diagram of FIG. 7 is given by the following equation:

$$\text{Deviation} = (\text{Achieved Throughput} - \text{Fair Share})/\text{Fair Share}.$$

In the SAFS architecture, two AF classes and two sub-queues are used for TCP and UDP, and the target rate of TCP and UDP are completely estimated by the SAFS architecture. The fairness rises with reduced deviation.

In FIG. 7, SAFS indicates the result achieved by the preferred embodiment, RIO is used as a token bucket marking mechanism which marks packets to two colors, srTCM denotes a single rate Three Color Marker mechanism as described in the IETF specification RFC 2697, and trTCM denotes a two rate Three Color Marker mechanism as described in the IETF specification RFC 2698, wherein the last two mechanisms both use a two token bucket for marking packets into three colors, i.e. green, yellow and red.

From FIG. 7, it can be seen that the SAFS mechanism according to the preferred embodiment can achieve nearly perfect fairness between TCP and UDP traffic at a broad network load range, even if the UDP sending rate is as high as 2 Mbps. Moreover, it can be gathered that the fairness of conventional scheduling procedures degrades substantially when the number of TCP connections decreases, while fairness can be guaranteed by the mechanism proposed in the present invention.

If the TCP SACK option is to be used, both ends of a TCP connection need to have a SACK function. However, while most implications of TCP are still of a Reno type, the SACK option may be not so popular. Nevertheless, simulation results show that a SAFS mechanism according to the preferred embodiment can improve fairness even if only one TCP Reno connection is used in one TCP aggregate.

Since SAFS is a scheduler algorithm suitable for DS network architectures, it can be used together with other marking algorithms at the edge of the DS network. The marking algorithms may be token bucket, srTCM, trTCM, or other TCP friendly marking algorithms suitable for DS networks.

Figure 8:
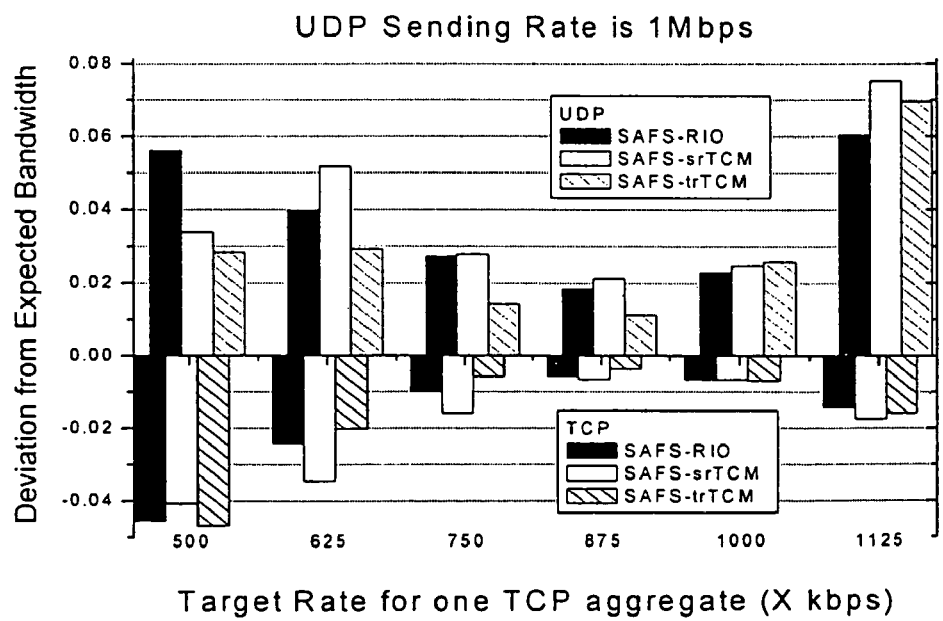
FIG. 8 shows a diagram indicating the deviation from the expected bandwidth for different TCP target rates and different packet marking mechanisms at a predetermined UDP sending rate.

In FIG. 8, simulation results indicating the deviation from the expected bandwidth for different target rates of one TCP aggregate and different marking algorithms or mechanisms are shown. From FIG. 8, it can be seen that the fairness between TCP and UDP changes only little when the SAFS mechanism according to the preferred embodiment is used with different marking algorithms. Therefore, any marking algorithm can be used at the edge servers E1 to E3 of the DS network. However, fairness among TCP connections themselves can be further improved by using TCM or other TCP friendly marking mechanisms. Moreover, different marking mechanisms at the edge of the DS network can be used for different implementations, while the SAFS mechanism according to the preferred embodiment works well with all of them. Thus, the SAFS mechanism according to the preferred embodiment enhances performance and fairness between responsive and non-responsive flows or, in general, between different traffic classes, so as to achieve a better resource utilization.

It is noted that the present application is not restricted to the preferred embodiment described above but can be used for any data scheduling function in packet data networks where the fair share between traffic classes is proportional to the in-profile traffic in each class. Thus, the preferred embodiment may vary within the scope of the attached claims.

The invention claimed is:

1. A method, comprising:
    marking a data packet by setting a differentiated services code point value in a data packet header of the data packet;
    classifying the data packet of an assured forwarding class based on a predetermined profile of different transport layer packets;
    estimating, by periodically calculating by a processor, an in-profile data packet arrival rate including a green packet rate of said data packet at a predetermined interval, the calculating determined as at least one of a moving average or a sliding window;
    queuing said data packet in a separate sub-queue of a plurality of sub-queues based on said in-profile data packet arrival rate;
    adjusting a weight according to said in-profile data packet arrival rate of said queued data packet, said weight determining a transmit order of said queued data packet;
    allocating bandwidth to each of the sub-queues proportional to said adjusted weight; and
    scheduling a data transmission of a plurality of predetermined traffic classes based on said adjusted weight.

2. The method according to claim 1, further comprising using a fair scheduling procedure in said scheduling step, said fair scheduling procedure being configured to allocate bandwidth to each sub-queue proportional to said adjusted weight.

3. The method according to claim 2, wherein said fair scheduling procedure is a weighted round robin, weighted fair queuing, virtual clock, or self-clocked fair queuing procedure.

4. The method according to claim 1, wherein said predetermined data packet profile is used to separate responsive traffic from non-responsive traffic.

5. The method according to claim 4, wherein said responsive traffic is transmit control protocol traffic and said non-responsive traffic is user datagram protocol traffic.

6. The method according to claim 1, wherein said in-profile rate is a green packet rate of three color marker marked packets.

7. The method according to claim 1, wherein said adjusting is performed periodically at a predetermined or dynamic interval.

8. The method according to claim 1, further comprising using a priority scheduling for an expedited forwarding class traffic, and sharing remaining bandwidth by said scheduling method.

9. An apparatus, comprising:
    a marker configured to mark a data packet by setting a differentiated services code point value in a data packet header of the data packet;
    a classifier configured to classify the data packet of an assured forwarding class based on a predetermined profile of different transport layer packets;
    an estimator configured to estimate, by periodically calculating, an in-profile data packet arrival rate including a green packet rate of said data packet at a predetermined interval, the calculating determined as at least one of a moving average or a sliding window; and
    a scheduler configured to adjust a weight according to said in-profile data packet arrival rate, wherein bandwidth is allocated to each of the sub-queues based on the adjusted weight;
    wherein said classifier is further configured to queue said data packet in a separate sub-queue based on said in-profile data packet arrival rate;
    wherein said weight determines a transmit order of said queued data packet; and
    wherein said scheduler is further configured to schedule a data transmission of a plurality of predetermined traffic classes based on said adjusted weight.

10. The apparatus of claim 9, wherein said apparatus is a core router of a differentiated service network.

11. A non-transitory computer readable storage medium encoded with instructions that, when executed by a computer, perform:
    marking a data packet by setting a differentiated services code point value in a data packet header of the data packet;

classifying the data packet of an assured forwarding class based on a predetermined profile of different transport layer packets;

estimating, by periodically calculating, an in-profile data packet arrival rate including a green packet rate of said data packet at a predetermined interval, the calculating determined as at least one of a moving average or a sliding window;

queuing said data packet in a separate sub-queue of a plurality of sub-queues based on said in-profile data packet arrival rate;

adjusting a weight according to said in-profile data packet arrival rate of said queued data packet, said weight determining a transmit order of said queued data packet;

allocating bandwidth to each of the sub-queues proportional to said adjusted weight; and scheduling a data transmission of a plurality of predetermined traffic classes based on said adjusted weight.

12. The non-transitory computer readable storage medium according to claim 11, wherein the instructions, when executed by the computer, further perform:

using a fair scheduling procedure in said scheduling step, said fair scheduling procedure being configured to allocate bandwidth to each sub-queue proportional to said adjusted weight.

13. The non-transitory computer readable storage medium according to claim 12, wherein said fair scheduling procedure is a weighted round robin, weighted fair queuing, virtual clock, or self-clocked fair queuing procedure.

14. The non-transitory computer readable storage medium according to claim 11, wherein said predetermined data packet profile is used to separate responsive traffic from non-responsive traffic.

15. The non-transitory computer readable storage medium according to claim 14, wherein said responsive traffic is transmit control protocol traffic and said non-responsive traffic is user datagram protocol traffic.

16. The non-transitory computer readable storage medium according to claim 11, wherein said in-profile rate is a green packet rate of three color marker marked packets.

17. The non-transitory computer readable storage medium according to claim 11, wherein said adjusting is performed periodically at a predetermined or dynamic interval.

18. The non-transitory computer readable storage medium according to claim 11, wherein the instructions, when executed by the computer, further perform:

using a priority scheduling for an expedited forwarding class traffic, and sharing remaining bandwidth by said scheduling method.

* * * * *